United States Patent [19]
Elsner et al.

[11] Patent Number: 5,843,389
[45] Date of Patent: Dec. 1, 1998

[54] MAGNESIUM PROCESS

[75] Inventors: Dagwin Elsner, Parkdale, Australia; Roger Norman Rothon, Sutton, United Kingdom

[73] Assignee: Flamemag International Gie, Paris, France

[21] Appl. No.: 680,935

[22] Filed: Jul. 16, 1996

Related U.S. Application Data

[63] Continuation of PCT/AU95/00024, Jan. 20, 1995.

[30] Foreign Application Priority Data

Jan. 21, 1994 [AU] Australia ................................ PM3460
Dec. 2, 1994 [AU] Australia ................................ PM9852

[51] Int. Cl.$^6$ ................................ C01F 5/20; C09L 3/08; C09L 1/02; C08L 31/04
[52] U.S. Cl. .......................... 423/162; 423/636; 423/639; 524/436; 106/471
[58] Field of Search .................................... 423/162, 636, 423/639; 524/436

[56] References Cited

U.S. PATENT DOCUMENTS

| 4,145,404 | 3/1979 | Miyata et al. ............................ 423/635 |
| 4,698,379 | 10/1987 | Nakaya et al. .......................... 523/513 |
| 5,476,642 | 12/1995 | Skubla et al. ........................... 423/162 |

FOREIGN PATENT DOCUMENTS

| 5043985 | 7/1988 | Australia . |
| 0160890 | 7/1991 | Czech Rep. . |
| 275256 | 2/1992 | Czech Rep. . |
| 214494 | 3/1987 | European Pat. Off. . |
| 0631984 | 5/1994 | European Pat. Off. . |
| 58-134134 | 8/1983 | Japan . |
| 2289420 | 11/1990 | Japan . |
| 3170325 | 7/1991 | Japan . |
| 2020135 | 7/1991 | Spain . |
| 541378 | 11/1941 | United Kingdom . |
| 1514081 | 6/1978 | United Kingdom . |
| 9013516 | 11/1990 | WIPO . |

OTHER PUBLICATIONS

S. Miyata et al., "Fire Retarding . . . " Appl. Polymer. Sci, 25: 415–425 (1980).
Derwent Abstract Accession No. 018114/03, Class A60, E33 G01, L02, JP,A,2289420 (Libe Kagaku Kogyo KK) 29 Nov. 1990.
Derwent Abstract Accession No. 87–073914/11, Class E33, EP–214–494 A, 14 Aug. 1985.
Chemical Abstracts of ES 2,020,135 of (Jul. 16, 1991).
Derwent Abstract of JP 3–170,325 of (Jul. 23, 1991).
Derwent Abstract of JP 58–134,134 of (Aug. 10, 1983).
Chemical Abstracts, vol. 101, No. 24, (Dec. 10, 1984) #213,414.
Chemical Abstracts of CZ 275,256 of (Feb. 19, 1992) #41797.

*Primary Examiner*—David Brunsman
*Attorney, Agent, or Firm*—Ladas & Parry

[57] ABSTRACT

The present invention provides a process for preparing a flame retardant quality magnesium hydroxide which includes providing a magnesium salt solution; and a source of ammonia; adding a stochiometric excess of ammonia to the solution to form a magnesium hydroxide precipatate; and subjecting the magnesium hydroxide to a hydrothermal recrystallization.

20 Claims, 5 Drawing Sheets

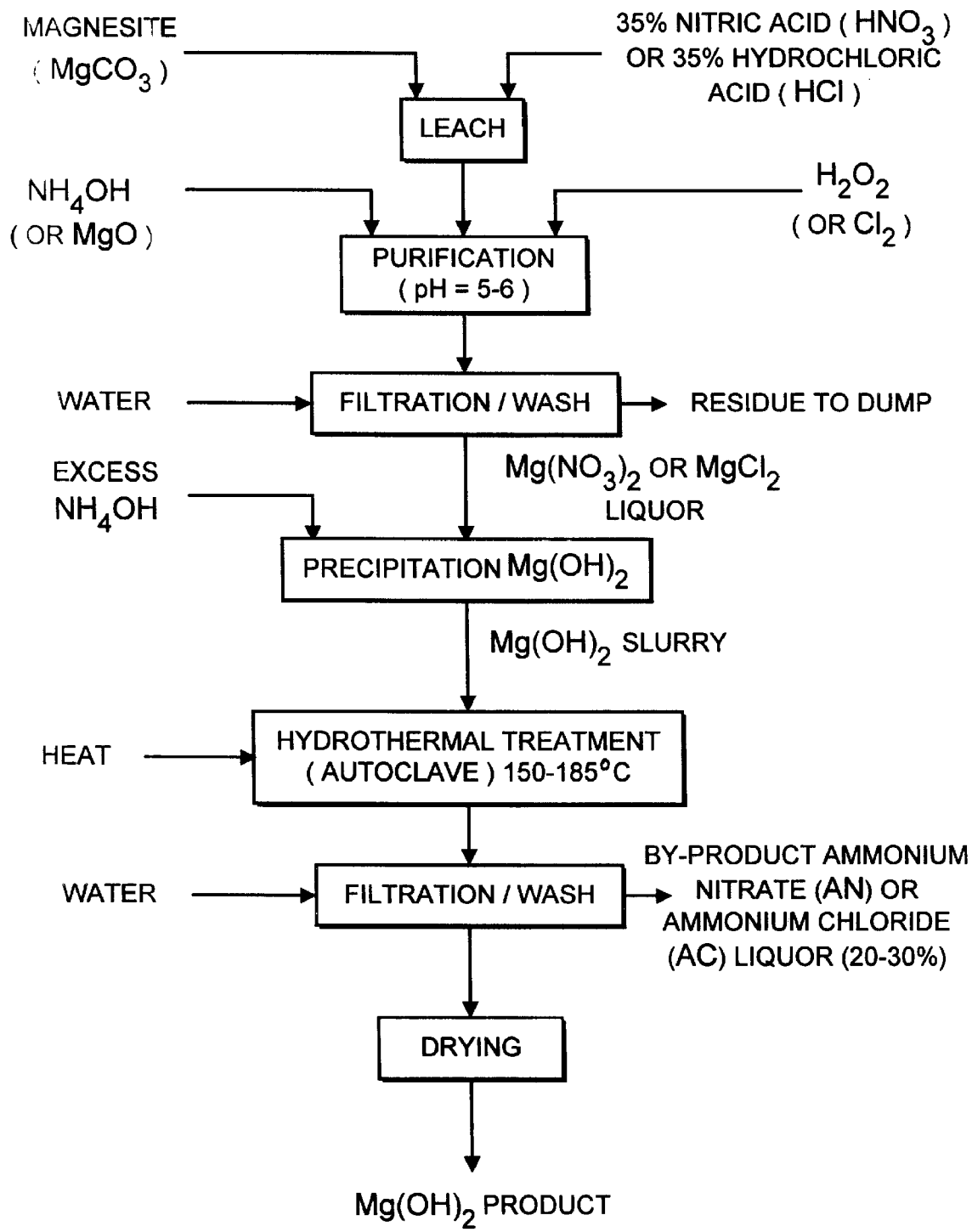
F I G. 1

MAGNESIUM PROCESS

This is a continuation-in-part of PCT/AU 95/00024 filed 20 Jan. 1995.

The present invention relates to a process for preparing magnesium hydroxide, in particular flame retardant magnesium hydroxide, and to magnesium hydroxide products produced therefrom.

Magnesium hydroxide is a staple industrial chemical which is used in a wide variety of areas. Magnesium hydroxide finds particular application as a component in thermoplastic synthetic resins to impart flame retardancy. However, the incorporation into thermoplastic synthetic resins can adversely effect the physical properties of the resins, in particular impact strength and elongation at break.

It is known in the prior art that the elongation at break and other properties of such thermoplastic resins may be improved by utilising magnesium hydroxide which is characterised by specific strain, crystallite size and surface area characteristics ("the desired type"). Production of this type of maonesium hydroxide is, for example, described in United Kingdom Patent 1,514,081 to Kyowa Chemical Industry Co. Ltd. The process of preparing such a magnesium hydroxide product requires that a magnesium salt solution is treated with base in substoichiometric quantities at low temperatures (eg. less than 60° C.) to precipitate a basic salt. The basic salt is then recrystallised in its mother liquor under fairly severe conditions (eg. 145° C. to 200° C.). Whilst such a process is effective, the process is very inefficient and conversion rates of magnesium are low, eg. of the order of 50 to 70%. Low magnesium recovery may lead to poor process economics and may also affect the subsequent disposal of the resulting ammoniacal salt solutions.

An alternative process for preparing magnesium hydroxide has been disclosed in Czech Patent 275,256, 1990, to RIIC. The RIIC patent describes a process for preparing magnesium hydroxide wherein a solution containing magnesium and calcium nitrates is treated with an excess of ammonia (eg. of 1.2 to 2.5 the stoichiometric amount) to generate a precipitate. It appears that no basic salt is generated, and autoclave recrystallisation is conducted under more mild conditions (eg. 130° C. to 160° C. for 10 to 90 minutes). It is suggested that the ability to recrystallise under these conditions is due to the presence of calcium and ammonium nitrates and free ammonia. However, the magnesium hydroxide product formed is not of the desired type, and thermoplastic resins into which it is incorporated do not demonstrate a high elongation at break. The process also suffers from difficulties in purification, due to the large concentration of calcium present (eg. 5 to 100 g/l). Moreover, the by-product ammonium nitrate formed cannot be used (eg. as a fertiliser or explosive) without further purification to remove calcium.

It is accordingly an object of the present invention to overcome, or at least alleviate, one or more of the difficulties relating to the prior art.

Accordingly, in a first aspect of the present invention there is provided a process for preparing a flame retardant quality magnesium hydroxide which includes
providing
   a magnesium salt solution; and
   a source of ammonia;
adding a stoichiometric excess of ammonia to the solution to form a magnesium hydroxide precipitate; and
subjecting the magnesium hydroxide to a hydrothermal recrystallisation.

It has been found that utilising the process according to the present invention a magnesium hydroxide product with a high elongation at break may be produced in high yield, eg. approximately 80% or greater (based on magnesium). The magnesium hydroxide product may in turn be of flame retardant quality.

The magnesium salt solutions utilised in the process of the present invention may be of any suitable type. A magnesium inorganic acid salt may be used. A magnesium nitrate or magnesium chloride solution may be used. A natural magnesium brine may be used.

If a magnesium nitrate solution is used, preferably it should contain from approximately 20–95 g/l, more preferably from approximately 30–85 g/l Mg. If a magnesium chloride solution is used, preferably it should contain from approximately 20–120 g/l, more preferably from approximately 30–120 g/l Mg.

In a further aspect of the present invention the process may include the preliminary step of
providing
   a magnesium-containing material; and
   a source of inorganic acid; and
treating the magnesium-containing material with the acid to form a magnesium salt.

The inorganic acid used may be nitric acid or hydrochloric acid. Where nitric acid is used, magnesium nitrate is formed ($Mg(NO_3)_2$). The nitric acid may be in the form of an aqueous solution of approximately 20 to 55% by weight of nitric acid.

Where hydrochloric acid is used, magnesium chloride is formed ($MgCl_2$). The hydrochloric acid may be provided in the form of an aqueous solution of approximately 20 to 35% by weight hydrochloric acid.

The magnesium-containing material may be of any suitable type. The magnesium-containing material may be a magnesium-containing ore. A magnesite or dolomite ore may be used. A magnesite ore is preferred. A magnesite-feed material such as macrocrystalline magnesite ore or cryptocrystalline magnesite ore may be used. By-product magnesium-containing materials may be used. By-product materials, containing $Mg(OH)_2$ and/or $MgO$ for example, may be used. A by-product material from the production of sea water magnesia may be used. This material may contain magnesium hydroxide, for example. Spent filter bed material from the purification of water or waste liquor treatments may be used. This material may contain $Mg(OH)_2$ and/or $MgO$.

Where the starting material contains $MgO$, it may be leached with an ammonium salt as an alternative to the acid leach referred to above.

Accordingly, in a alternative preferred aspect of the present invention the process may include the preliminary step of
providing
   a magnesium oxide-containing material; and
   an ammonium salt; and
leaching the magnesium oxide-containing material with the ammonium salt to from a magnesium salt.

The ammonium salt used in the leaching step may be of any suitable type. The ammonium salts ammonium nitrate ($NH_4NO_3$), and ammonium chloride ($NH_4Cl$) are preferred.

The leaching step may be conducted at elevated temperature, e.g. from approximately 60° C. to 120° C. The leaching step may be assisted by the injection of steam.

Ammonia generated during the leaching step may be utilised to form the ammonium hydroxide utilised in the later precipitation. For example the ammonia may be mixed with water in a suitable absorption device to form ammonium hydroxide.

Thus, the ammonium salt by-product formed according to this aspect of the present invention may be recycled. Thus, for example, the ammonium nitrate or ammonium chloride formed as a by-product in the process according to the present invention may be recycled.

Accordingly, in a preferred aspect of the present invention, the process may further include the subsequent step of recycling at least a portion of the ammonium salt so formed to the leach step.

Alternatively or in addition, the ammonium nitrate or ammonium chloride formed as a by-product may be utilised, eg. in the production of fertilisers or explosives. This is particularly so where a magnesite raw material is used, as the calcium content of the by-product is very low.

The leachate from the leaching process may be subjected to a purification step prior to further processing.

Accordingly in a preferred aspect the process according to the present invention further includes subjecting the leachate to a filtration step to remove residue.

In the process of the present invention, a MgO-containing starting material is particularly preferred. Whilst applicants do not wish to be restricted by theory, it is postulated that the use of this starting material minimises organic impurities in the magnesium salt solution formed therefrom. This in turn results in a whiter product and improved crystallisation.

Accordingly in a preferred aspect of the present invention, the magnesium salt solution has a low organic content.

Where the magnesium-containing material is a magnesite, the magnesite-feed material may be calcined in any known manner. The magnesite-feed material may be heated at temperatures above approximately 650° C., preferably in the range of approximately 800° to 1000° C. under calcining conditions. The heating may continue for approximately 1 to 8 hours, preferably approximately 3 to 5 hours.

The magnesium-containing material may be subjected to suitable crushing and/or grinding steps prior to salt solution formation.

The magnesium salt solution so formed may be buffered to an approximately neutral pH value before further processing including purification as discussed below.

In a preferred aspect of the present invention a relatively pure magnesium salt solution is used. By the term "relatively pure" as used herein we mean that trace impurities in the solution are at a level such that they do not substantially interfere with the process. Preferably, the relatively pure magnesium salt solution contains less than 100 ppm, more preferably less than 10 ppm, and most preferably less than 1 ppm transitional element impurities. The transitional element impurities may be metal impurities. In a particularly preferred form, the magnesium salt solution contains less than 50 ppm, more preferably less than 10 ppm, most preferably less than 1 ppm Fe and/or Mn. Applicant has found that the level of Ca impurities does not substantially affect the efficiency of the process.

Depending on the starting material used, it is preferred in certain circumstances to subject the magnesium salt solution to a purification step to remove trace impurities. The trace impurities may be transition element impurities. The transition element impurities may be metal impurities, for example Fe, Ni, Cu and/or Mn.

Accordingly, in a preferred aspect, the process of the present invention includes a preliminary purification step which includes providing
  a magnesium salt solution;
  a source of base; and
  a source of oxidant;

adding the source of base to the magnesium salt solution to raise the pH thereof;
treating the magnesium salt solution with the source of oxidant to oxidise trace impurities therein; and
removing trace impurities as their insoluble hydroxides.

The source of base may be of any suitable type which will raise the pH of the magnesium salt solution. For example, ammonium hydroxide ($NH_4OH$) and magnesium oxide (MgO) have been found to be suitable. Ammonium hydroxide is preferred.

Preferably, the pH of the magnesium salt solution is raised to approximately pH 4–7, more preferably approximately pH 5–6.

The source of oxidant may be of any suitable type. Hydrogen peroxide ($H_2O_2$) is preferred. Alternatively, if the magnesium salt solution contains magnesium chloride, the source of oxidant may be Chlorine ($Cl_2$).

The trace impurities may be removed as their insoluble hydroxides by filtration.

In the precipitation step according to the present invention, the purified magnesium salt solution, eg. a magnesium nitrate $Mg(NO_3)_2$ solution is then treated with a stoichiometric excess of ammonia. The ammonia may be provided in the form of ammonium hydroxide.

The amount of ammonia used may be such that the ammonia is present in the range of approximately 120 to 250% of the stoichiometric amount, preferably 150 to 250%, more preferably approximately 175 to 200% of the stoichiometric amount.

It is preferred to conduct the precipitation step at a temperature below approximately 80° C., more preferably less than approximately 50° C., most preferably less than approximately 40° C., to improve the flame retardant quality of the magnesium hydroxide ultimately formed.

The hydrothermal recrystallisation step may be conducted at temperatures to approximately 130° C. to 195° C. or higher, preferably approximately 150° C. to approximately 190° C. more preferably approxmately 170° C. to approximately 185° C. The hydrothermal recrystallisation may continue from approximately 30 minutes to 6 hours, preferably approximately 1 to 4 hours. The hydrothermal recrystallisation step is typically conducted in an autoclave that is, under superatmospheric pressure. When a magnesium chloride solution is used in the process of the present invention, the hydrothermal recrystallisation may be conducted at lower temperatures and for shorter times than those specified above. Higher precipitation temperatures may be successfully employed.

The magnesium hydroxide product so formed may be subjected to a purification step. The magnesium hydroxide product may be cooled, filtered and the cake washed with water to produce a purified magnesium hydroxide product.

In a preferred aspect of the present invention the process for preparing a purified hydroxide magnesium product may further include
subjecting the purified $Mg(OH)_2$ product to a drying step.

The drying step may be conducted utilising conventional techniques.

The drying may be conducted utilising a band dryer, pneumatic dryer, fluid bed dryer or the like or a combination thereof.

The $Mg(OH)_2$ product may be subjected to a calcining step to produce an MgO product. Calcining conditions may be similar to those used for magnesite treatment as discussed above.

In a further aspect of the present invention there is provided a flame retardant quality magnesium hydroxide whenever prepared according to the process as described above.

The magnesium hydroxide product may be characterised by having a BET surface area of less than approximately 10 m² per gram (uncoated), preferably less than approximately 8 m² per gram;

an average particle size of approximately 0.5 to 5.0 micron, preferably approximately 0.5 to 3.5 micron, and less than approximately 0.5% of particles over 10 micron (average particle size measured by laserlight scattering method).

Accordingly, in a preferred embodiment there is provided magnesium hydroxide containing hexagonal crystals with a low BET specific surface area less than approximately, 7 m²/g, a median particle size of approximately 0.5 to 5.0 micron and an oil absorption less than approximtaely 60 mL/100 g (oil absorption measured under International Standard ISO 787/5-1980(E)).

When a magnesium chloride solution is used in the process of the present invention, the magnesium hydroxide so formed contains crystals which are generally oval in cross section. Accordingly in an alternative preferred embodiment there is provided magnesium hydroxide containing crystals being generally oval in cross section and having a low BET specific surface area less than approximately 7 m²/g, a median particle size of approximately 0.5 to 5.0 micron and an oil absorption less than approximately 60 mL/100 g (oil absorption measured under International Standard ISO 787/5-1980(E)).

In a further preferred aspect of the present invention, the magnesium hydroxide may be coated with a surface active agent, preferably an anionic surfactant. A fatty acid surface active agent is preferred.

The anionic surface active agent may be selected from the group consisting of stearic acid, oleic acid, lauric acid, palmitic acid, sodium stearate, potassium behenate, sodium montanate, potassium stearate, sodium oleate, potassium oleate, sodium palmitate, potassium palmitate, sodium laurate, potassium laurate, sodium dilauryl benzenesulfonate, potassium octadecylfsulfate, sodium laurylsulfonate, disodium 2-sulfoethyl α-sulfostearate and ammonium salts of fatty acids, for example ammonium stearate. These anionic surfactants may be used either alone or as mixtures of two or more.

Ammonium stearate and sodium stearate are particularly preferred coating agents.

The magnesium hydroxide product may be incorporated into a polymeric composition in order to minimise the loss of useful properties including tensile elongation and tensile strength. Accordingly in a further preferred aspect there is provided a polymeric composition including a thermoplastic polymer; and a magnesium hydroxide component containing hexagonal crystals or crystals being generally oval in cross section with a lose BET specific surface area less than 7 m²/g, a median particle size of approximately 0.5 to 5.0 micron and an oil absorption less than approximately 60 mL/100 g (oil absorption measured under International Standard ISO 787/5-1980(E)).

The thermoplastic polymer may be a thermoplastic synthetic resin. The thermoplastic synthetic resin may be selected from the group consisting of homo- or co-polymers of styrene, homo- or co-polymers of propylene, homo- or co-polymers of olefins including ethylene, vinyl resins, polyester resins, polycarbonate resins, nylon resins, acetate resins, acetal resins and blends thereof. A co-polymer of ethylene, such as ethylene vinyl acetate (EVA) is preferred.

Various conventional additives may further be incorporated in the polymeric compositions in accordance with this invention.

Examples of these additives are coloring agents (organic and inorganic pigments) such as isoindolinone, cobalt aluminate, carbon black, or cadmium sulfide; other fillers such as calcium carbonate, alumina, zinc oxide or talc; anti-oxidants such as 2,6-di-t-butyl-4-methylphenol, 2,2'-methylenebis (4-methyl-6-t-butylphenol), dilauryl thiodipropionate or tridecyl phosphite; ultraviolet absorbers such as 2-hydroxy-4-methoxy benzophenone, 2(2'-hydroxy-5-methylphenyl)benzotriazole, 2-ethylhexyl-2-cyano-3,3-diphenyl acrylate, phenyl salicylate or nickelbisoctyl phenyl sulfide; plasticizers such as di-2-ethyl hexyl phthalate, di-n-butyl phthalate, butyl stearate, of epoxidized soybean oil; and lubricants such as zinc stearate, calcium, aluminium and other metal soaps, or polyethylene wax.

The polymeric composition may be provided in the form of polymeric articles, for example melt-shaped articles.

The magnesium hydroxide component may be a coated magnesium hydroxide. In this embodiment, a thermoplastic EVA product may exhibit a high elongation at break, eg. of greater than approximately 200%, preferably greater than approximately 300% and a high limiting oxygen index, eg. of greater than approximately 35% v/v, preferably greater than approximately 40% v/v.

The polymeric articles may take the form or cable sheathing or insulation materials.

The present invention will now be more fully described with reference to the accompanying examples. It should be understood, however, that the description following is illustrative only and should not be taken in any way as a restriction on the generality of the invention described above.

BRIEF DESCRIPTION OF THE DRAWINGS

FIG. 1 is a flow diagram illustrating a preferred form of one aspect of the process of the present invention.

EXAMPLE 1

Figure 2:
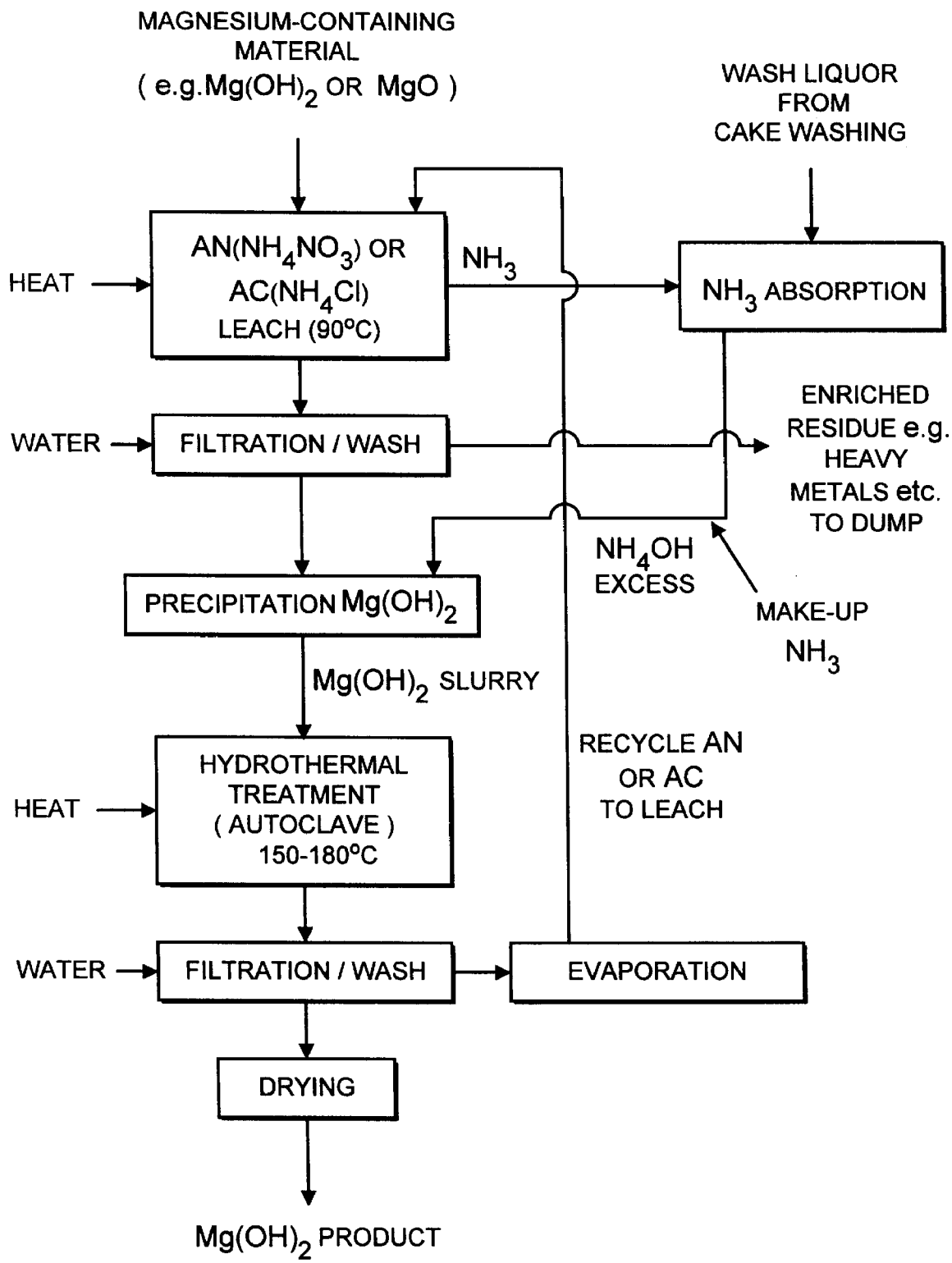
FIG. 2 is a flow diagram illustrating a preferred form of a further aspect of the process of the present invention.
Figure 3A:
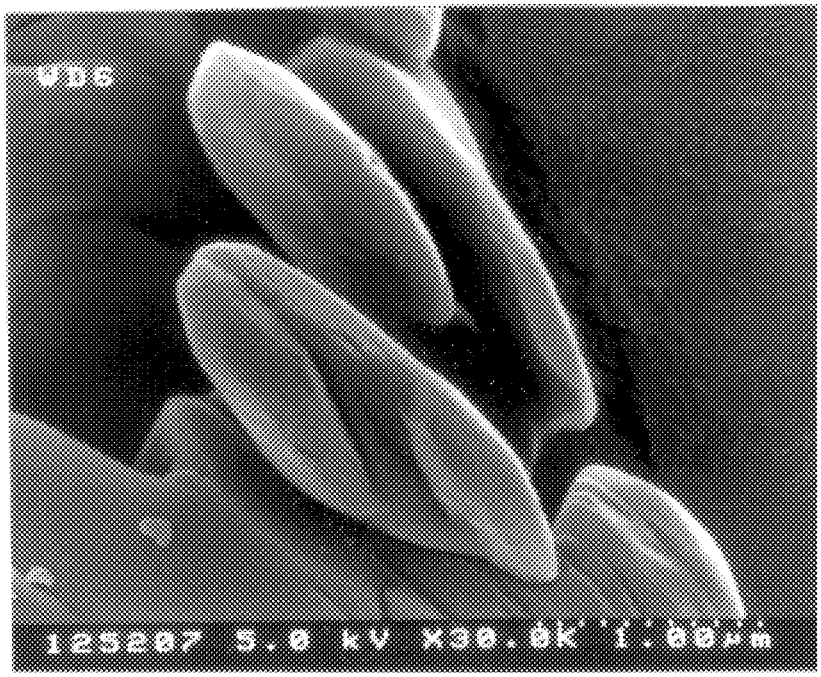
FIG. 3 is a scanning electron micrograph showing magnesium hydroxide containing crystals produced according to the process of the present invention using magnesium chloride solution.
Figure 3B:
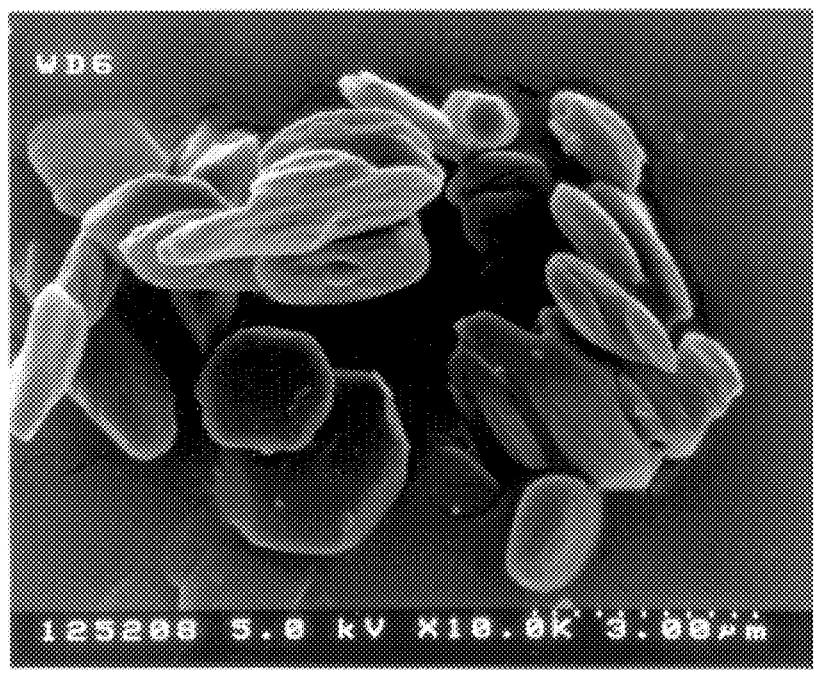
Figure 3C:
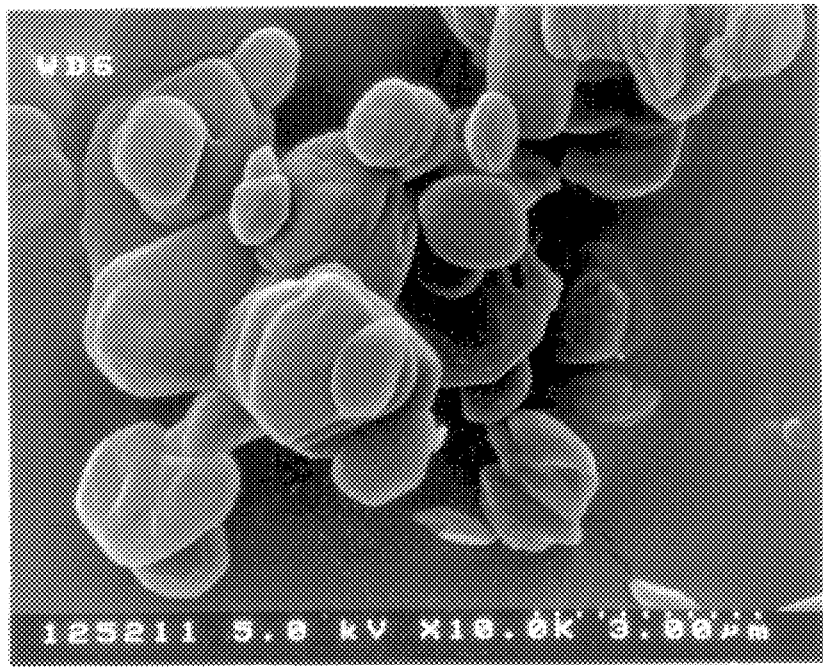
Figure 4A:
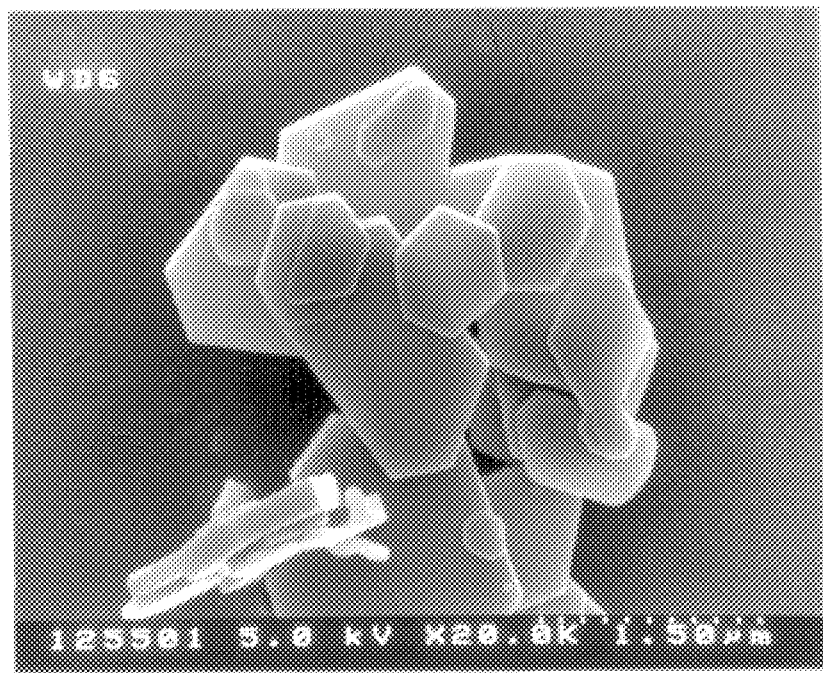
FIG. 4 is a scanning electron micrograph showing magnesium hydroxide containing crystals produced according to the process of the present invention using magnesium nitrate solution.
Figure 4B:
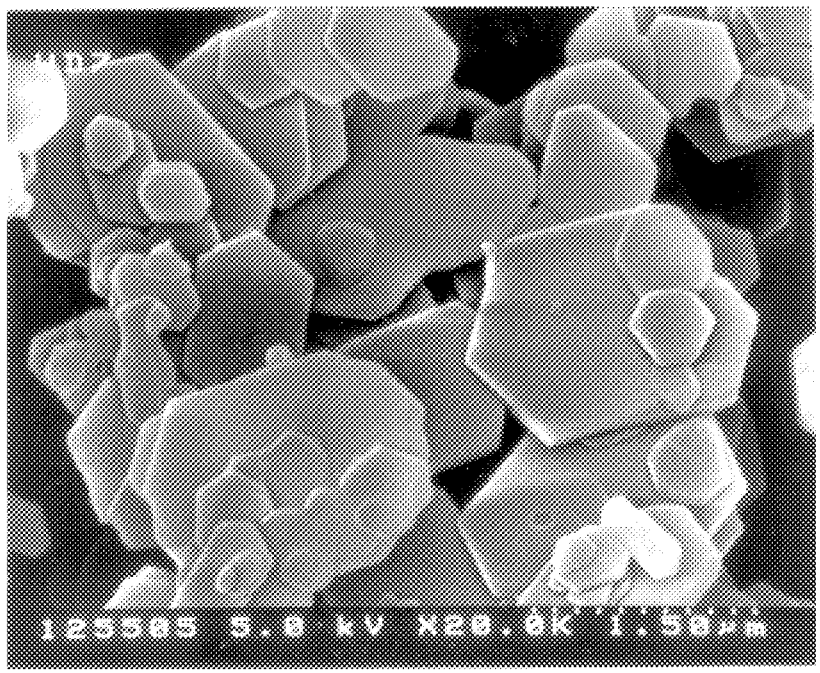
Figure 4C:
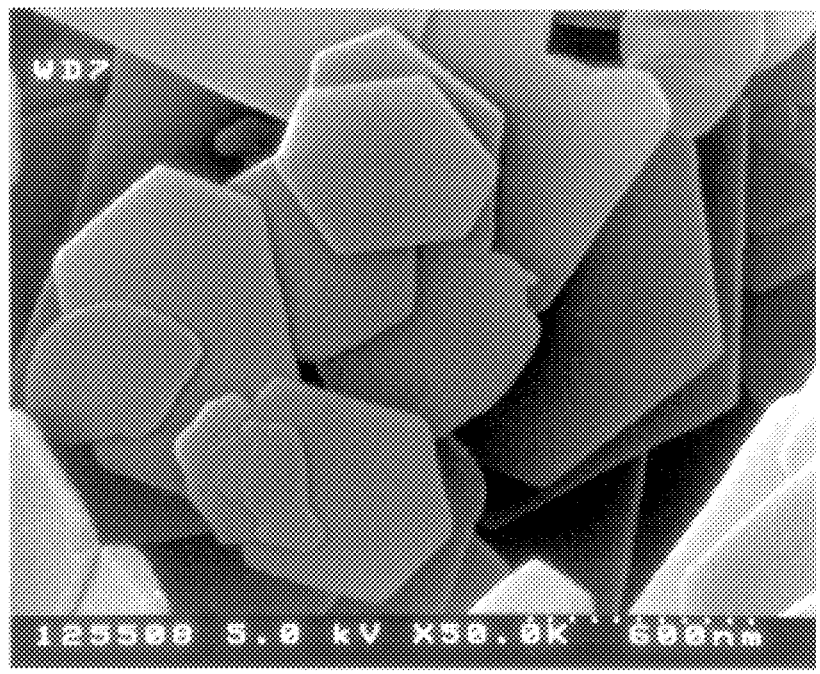

Magnesium hydroxide was precipitated from a nitrate solution containing 35 g/L Mg, 0.9 g/L Ca, 1.5 mg/L Ni, <1 mg/L Fe and <1 mg/L Mn. The precipitation was carried out batchwise in a 5 litre baffled SS vessel. Agitation was by 6-blade turbine driven by an overhead stirrer motor. The temperature was controlled by hotplate. The operations conditions were as follows:

concentration of $NH_4OH$: 28% w/w
$NH_4OH$ addition: 1.8×stoichiometric
final pH: 9.5
time of $NH_4OH$ addition: 10 minutes
total residence time: 30 minutes
temperature: 30° C.

The slurry from the precipitation was then hydrothermally treated in an autoclave at 180° C. for 4 hours. Autoclaved magnesium hydroxide was subsequently filtered and washed. 91.1% of the magnesium contained in the feed solution was recovered as magnesium hydroxide. The by-product ammonium nitrate liquor contained 15% by weight ammonium nitrate, 1.3% magnesium nitrate and 0.6% calcium nitrate.

The wet filter cake was reslurried in water to a strength of 10% solids. The slurry was heated to 60° to 65° C. 2.5° w/w (magnesium hydroxide) of stearic acid and a stoichiometric amount of 30% $NH_4OH$ were added. The slurry was left agitated at 60° to 65° C. for ½ hour. The coated material was then filtered, washed with water and dried at 110° C. for 12 hours. The dry powder had the following physical characteristics:

BET specific surface area: 2.9 $m^2$/g median particle size: 1.9 micron oil adsorption (linseed oil): 50 mL/100 g The stearate coated magnesium hydroxide was compounded in a two-roll mill compounder with ethylene vinyl acetate (EVA) polymer at a loading of 60% w/w. The physical properties determined on samples cut from compression moulded sheets of the compound were as follows:

tensile strength: 7.8 Mpa elongation at break: 688% limiting oxygen index: 50% v/v

EXAMPLE 2

Magnesium hydroxide was precipitated from a nitrate solution containing 82.5 g/L Mg, 2 g/L Ca and <1 mg/L each of Fe, Mn, Ni and Cu. The precipitation was carried out batchwise in a 50 L baffled and jacketed vessel (autoclave). Agitation was by a 6-blade turbine. The temperature was adjusted with steam. The operating conditions were as follows:

concentration of $NH_4OH$: 30% w/w $NH_4OH$ addition: 1.8×stoichiometric time of $NH_4OH$ addition: 18.5 minutes final pH: 9.5 precipitation temperature: 30° C.

After the completion of the $NH_4OH$ addition the primary magnesium hydroxide slurry was heated to the target temperature of 185° C. and hydrothermally treated in the autoclave at this temperature for 2 hours. The autoclaved product was then transferred into a receiving vessel, filtered and washed with de-ionised water by multiple reslurrying. 95% of the magnesium contained in the feed solution was recovered as magnesium hydroxide. The by-product ammonium nitrate liquor contained 25% by weight ammonium nitrate. 1.2% magnesium nitrate, 0.4% calcium nitrate and <5% free ammonia.

The wet washed filter cake was reslurried in de-ionised water to a strength of 10% solids. The slurry was heated to 60°–70° C. 2.5% w/w (magnesium hydroxide) of stearic acid and 30% $NH_4OH$ in excess (2×stoichiometric in relation to ammonium stearate) were added. The slurry was left agitated at 60°–70° C. for ½ hour. The coated material was then filtered and dried at 110° C. for 24 hours. The dry coated powder had the following characteristics:

BET specific surface area: 5.5 $m^2$/g median particle size: 1.4 micron oil absorption (linseed oil): 47 mL/100 g The stearate coated magnesium hydroxide was compounded in a two-roll mill compounder with ethylene vinyl acetate (EVA) at a loading of 60% w/w. The physical properties determined on samples cut from compression moulded sheets of the compound were as follows:

tensile strength: 6.3 Mpa elongation at break: 349% limiting oxygen index: 50% v/v

EXAMPLE 3

Magnesia produced from Kunwarara magnesite at 1000° C. was leached batchwise in an unbaffled glass beaker. Agitation was achieved with a propeller driven by an overhead stirrer motor. The temperature was controlled with a hotplate. The operating conditions were as follows:

size of magnesia: minus 425 $\mu$m leachant solution: 28% w/w $NH_4NO_3$ leaching temperature: 85° C.

leaching time: 7.5 hours.

On leaching 97.7% of the magnesium contained in the feed was extracted. The leach liquor contained 48.5 g/L Mg, 2.6 g/L Ca and <1 mg/L Fe, Mn, Ni.

Above leach solution was diluted with distilled water to 35 g/L Mg prior to the precipitation of magnesium hydroxide. The precipitation was carried out batchwise in a 5 litre baffled SS vessel. Agitation was by 6-blade turbine driven by an overhead stirrer motor. The temperature was controlled with a hotplate. The operating conditions were as follows:

concentration of $NH_4OH$: 30% w/w $NH_4OH$ addition: 1.8×stoichiometric time of $NH_4OH$ addition: 10 minutes total residence time: 30 minutes temperature: 30° C.

final pH: 9.1

The slurry from the precipitation was then hydrothermally treated in an autoclave at 180° C. for 4 hours. Autoclaved magnesium hydroxide was subsequently filtered, washed and dried at 110° C. for 12 hours. 85.6% of the magnesium contained in the feed solution was recovered as magnesium hydroxide. The dry powder had the following physical characteristics:

BET specific surface area: 5.0 $m^2$/g

Median particle size: 2 $\mu$m

Oil absorption (linseed oil): 60 mL/100 g

EXAMPLE 4

Magnesium hydroxide was precipitated from a chloride solution containing 81.5 g/L Mg, 0.05 g/L Ca, 1.7 mg/L Ni and <1mg/L Fe, Mn. The batch precipitation was carried out with the same equipment that was used in examples 1 and 3. The operating conditions were follows:

concentration of $NH_4OH$: 30% w/w $NH_4OH$ addition: 1.8×stoichiometric time of $NH_4OH$ addition: 19 minutes precipitation temperature: 25° C.

After completion of the $NH_4OH$ addition the primary slurry was transferred into an autoclave, heated to the target temperature of 185° C. and hydrothermally treated at this temperature for 2 hours. The autoclaved magnesium hydroxide was then filtered and washed.

The wet washed filter cake was reslurried in de-ionised water to a strength of 10% solids. The slurry was heated to 60° C. 2.5% w/w (magnesium hydroxide) of steanic aciad and the stonchiometric amount of $NH_4OH$ (30% w/w) were added. The slurry was left agitated at 60 C. for ½ hour. The stearate coated material was then filtered and dried at 110° C. for 72 hours. The dry coated power had the following physical characteristics:

BET specific surface area: 1.9 $m^2$/g

Median particle size: 2.7 μm

Oil absorption (linseed oil): 41 mL/100 g

The stearate coated magnesium hydroxide was compounded in a two-roll mill compounder with ethylene vinyl acetate (EVA) at a loading of 60% w/w. The physical properties determined on samples cut from compression moulded sheets of the compound were as follows:

Tensile strength: 8.2 MPa

Elongation at break: 721%

Finally, it is to be understood that various other modifications and/or alterations may be made without departing from the spirit of the present invention as outlined herein.

We claim:

1. A process for preparing a flame retardant quality magnesium hydroxide which includes
providing
a magnesium oxide-containing material; an
ammonium salt selected from the group consisting of ammonium nitrate ($NH_4NO_3$) and ammonium chloride ($NH_4Cl$); and
a source of ammonia;
leaching the magnesium oxide-containing material with the ammonium salt to form a magnesium salt solution;
adding a stoichiometric excess of ammonia to the magnesium salt solution to form a magnesium hydroxide precipitate;
recycling at least a portion of the ammonium nitrate or ammonium chloride formed as a by-product in the addition step to the leaching step; and
subjecting the magnesium hydroxide to a hydrothermal recrystallisation at a superatmospheric pressure.

2. A process according to claim 1 wherein, in the precipitation step, ammonia is present in the range of approximately 150% to 250% of the stoichiometric amount and the precipitation step is conducted at a temperature below approximately 80° C.

3. A process according to claim 2 wherein the hydrothermal recrystallisation step is conducted at temperatures of approximately 130° C. to 195° C. and continues for from approximately 30 minutes to approximately 6 hours.

4. A flame retardant quality magnesium hydroxide whenever prepared by a process according to claim 1.

5. A process for preparing a flame retardant quality magnesium hydroxide which includes
providing
a magnesium chloride solution; and
a source of ammonia;
adding a stoichiometric excess of ammonia to the solution to form a magnesium hydroxide precipitate; and
subjecting the magnesium hydroxide to a hydrothermal recrystallisation at a superatmospheric pressure.

6. A process according to claim 5 wherein, in the precipitation step, ammonia is present in the range of approximately 150% to 250% of the stoichiometric amount and the precipitation step is conducted at a temperature below approximately 80° C.

7. A process according to claim 6 wherein the hydrothermal recrystallisation step is conducted at temperatures of approximately 130° C. to 195° C. and continues for from approximately 30 minutes to approximately 6 hours.

8. A process according to claim 5 including the preliminary step of
providing
a magnesium-containing material; and
a source of hydrochloric acid; and
treating the magnesium-containing material with the acid to form magnesium chloride ($MgCl_2$).

9. A process for preparing flame retardant quality magnesium hydroxide which includes
providing
a relatively pure magnesium salt solution; and
a source of ammonia;
adding a stoichiometric excess of ammonia to the relatively pure magnesium salt solution to form a magnesium hydroxide precipitate; and
subjecting the magnesium hydroxide to a hydrothermal recrystallisation at superatmospheric pressure and at a temperature of approximately 170° C. to approximately 185° C.

10. A process according to claim 9 wherein the process further includes a preliminary purification step which includes providing
a magnesium salt solution;
a source of base; and
a source of oxidant;
adding the source of base to the magnesium salt solution to raise the pH thereof;
treating the magnesium salt solution with the source of oxidant to oxidise trace impurities therein; and
removing trace impurities as their insoluble hydroxides to produce the relatively pure magnesium salt solution.

11. A process according to claim 9 wherein, in the precipitation step, ammonia is present in the range of approximately 150% to 250% of the stoichiometric amount and the precipitation step is conducted at a temperature below approximately 80° C.

12. A process according to claim 11 wherein the hydrothermal recrystallisation step continues for approximately 30 minutes to approximately 6 hours.

13. A process according to claim 9 including the preliminary step of
providing
a magnesium-containing material; and
a source of inorganic acid; and
treating the magnesium-containing material with the acid to form a magnesium salt.

14. A process according to claim 13, wherein the inorganic acid is selected from the group consisting of nitric acid and hydrochloric acid.

15. A process according to claim 14, wherein the relatively pure magnesium salt solution is a magnesium nitrate solution and the inorganic acid is nitric acid.

16. A flame retardant quality magnesium hydroxide having
a BET surface area of less than approximately 8 $m^2$ per gram (uncoated),
an average particle size of approximately 0.5 to 5.0 micron, less than approximately 0.5% of particles over 10 micron (average particle size measured by laserlight scattering method), and an oil absorption less than approximately 60 ml/100 g (oil absorption measured under International Standard (ISO 787/5-1980(E)).

17. A magnesium hydroxide according to claim 16 containing hexagonal crystals or crystals being generally oval in cross section, with a low BET specific surface area less than approximately 7 $m^2/g$, and a median particle size of approximately 0.5 to 5.0 micron.

18. A coated magnesium hydroxide product including
a flame retardant quality magnesium hydroxide containing hexagonal crystals or crystals being generally oval in cross-section, with a low BET specific surface area less than approximately 7 m$^2$/g, a median particle size of approximately 0.5 to 5.0 micron and an oil absorption less than approximately 60 mL/100 g (oil absorption measured under International Standard ISO 787/5-1980(E)); and an anionic surface active agent selected from the group consisting of stearic acid, oleic acid, lauric acid, palmitic acid, sodium stearate, potassium behenate, sodium montanate, potassium stearate, sodium oleate, potassium oleate, sodium palmitate, potassium palmitate, sodium laurate, potassium laurate, sodium dilauryl benzenesulfonate, potassium octadecylsulfate, sodium laurylsulfonate, disodium 2-sulfoethyl α-sulfostearate and ammonium salts of fatty acids, and mixtures thereof coated on the magnesium hydroxide.

19. A polymeric composition including
a thermoplastic polymer; and
a magnesium hydroxide component containing hexagonal crystals or crystals being generally oval in cross section with a low BET specific surface area less than 7 m$^2$/g, a median particle size of approximately 0.5 to 5.0 micron and an oil absorption less than approximately 60 mL/100 g (oil absorption measured under International Standard ISO 787/5-1980(E)).

20. A polymeric composition according to claim 19 wherein the thermoplastic polymer is an ethylene vinyl acetate copolymer, the polymeric composition exhibiting an elongation at break of greater than approximately 200% and a limiting oxygen index of greater than approximately 35% v/v.

* * * * *